United States Patent
Gerding et al.

(10) Patent No.: US 8,242,965 B2
(45) Date of Patent: Aug. 14, 2012

(54) DIELECTRIC ANTENNA

(75) Inventors: Michael Gerding, Bochum (DE);
Thomas Musch, Bochum (DE); Nils Pohl, Bochum (DE)

(73) Assignee: KROHNE Messtechnik GmbH & Co. KG, Duisburg (DE)

( * ) Notice: Subject to any disclaimer, the term of this patent is extended or adjusted under 35 U.S.C. 154(b) by 480 days.

(21) Appl. No.: 12/426,374

(22) Filed: Apr. 20, 2009

(65) Prior Publication Data
US 2009/0262038 A1 Oct. 22, 2009

(30) Foreign Application Priority Data
Apr. 21, 2008 (DE) .......................... 10 2008 020 036

(51) Int. Cl.
*H01Q 13/00* (2006.01)
*H01Q 19/06* (2006.01)

(52) U.S. Cl. ......................... 343/783; 343/785; 343/753

(58) Field of Classification Search .................. 343/783, 343/785, 786, 911 R, 753, 907–910; 342/124
See application file for complete search history.

(56) References Cited

U.S. PATENT DOCUMENTS

| | | | |
|---|---|---|---|
| 3,252,160 A * | 5/1966 | Karger | 343/783 |
| 3,389,394 A * | 6/1968 | Lewis | 343/725 |
| 4,218,683 A | 8/1980 | Hemming | |
| 5,117,240 A * | 5/1992 | Anderson et al. | 343/786 |
| 6,353,417 B1 * | 3/2002 | Yuanzhu | 343/785 |
| 6,661,389 B2 * | 12/2003 | Griessbaum et al. | 343/786 |
| 6,859,187 B2 | 2/2005 | Ohlsson | |
| 6,992,639 B1 * | 1/2006 | Lier | 343/786 |
| 7,190,324 B2 * | 3/2007 | Henderson | 343/909 |
| 7,864,104 B2 * | 1/2011 | Chen et al. | 342/124 |
| 2009/0212996 A1 | 8/2009 | Chen et al. | |

FOREIGN PATENT DOCUMENTS

| | | |
|---|---|---|
| DE | 19617963 A1 * | 11/1997 |
| DE | 102 06 110 A1 | 8/2003 |
| WO | 90/13927 A1 | 11/1990 |
| WO | 2004/088793 A1 | 10/2004 |

* cited by examiner

*Primary Examiner* — Douglas W Owens
*Assistant Examiner* — Jennifer F Hu
(74) *Attorney, Agent, or Firm* — Roberts Mlotkowski Safran & Cole, P.C.; David S. Safran

(57) ABSTRACT

A dielectric antenna having an at least partially dielectric body and an electrically conductive sheath, wherein the dielectric body can be struck on a supply section with electromagnetic radiation and the electromagnetic radiation can be at least partially emitted from the dielectric body via a lens-shaped radiation section. The conductive sheath essentially surrounds the dielectric body from the supply section to the radiation section and a supply opening is provided in the conductive sheath in the area of the supply section and a radiation opening is provided in the conductive sheath in the area of the radiation section. The dielectric antenna that is easy to produce, has little interference and has a short construction as a result of the dielectric antenna having essentially the cross section of the radiation opening in the area of the supply section.

18 Claims, 4 Drawing Sheets

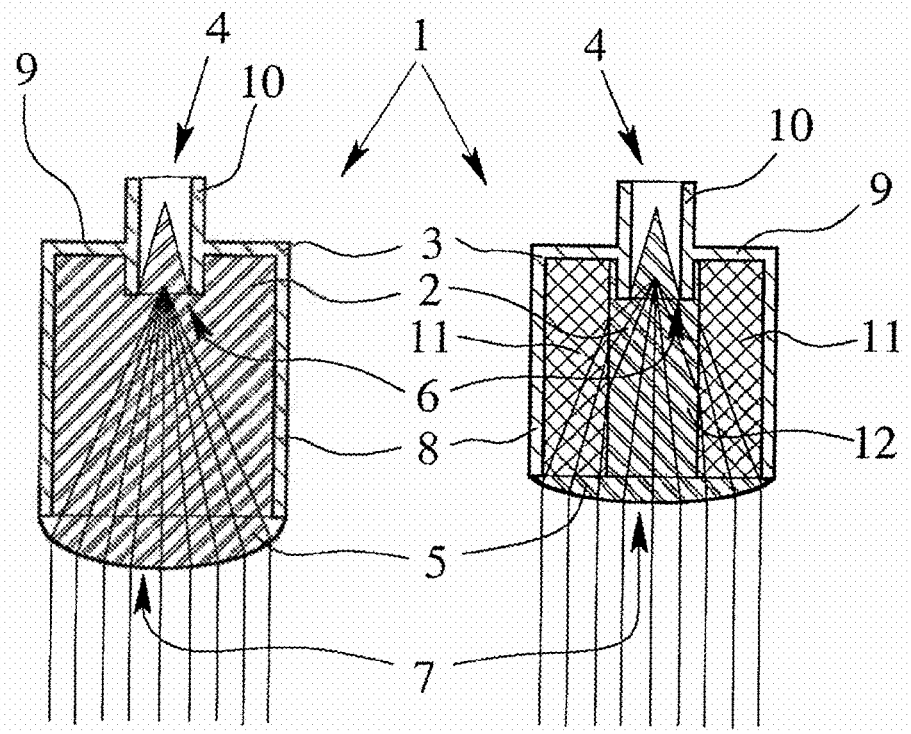
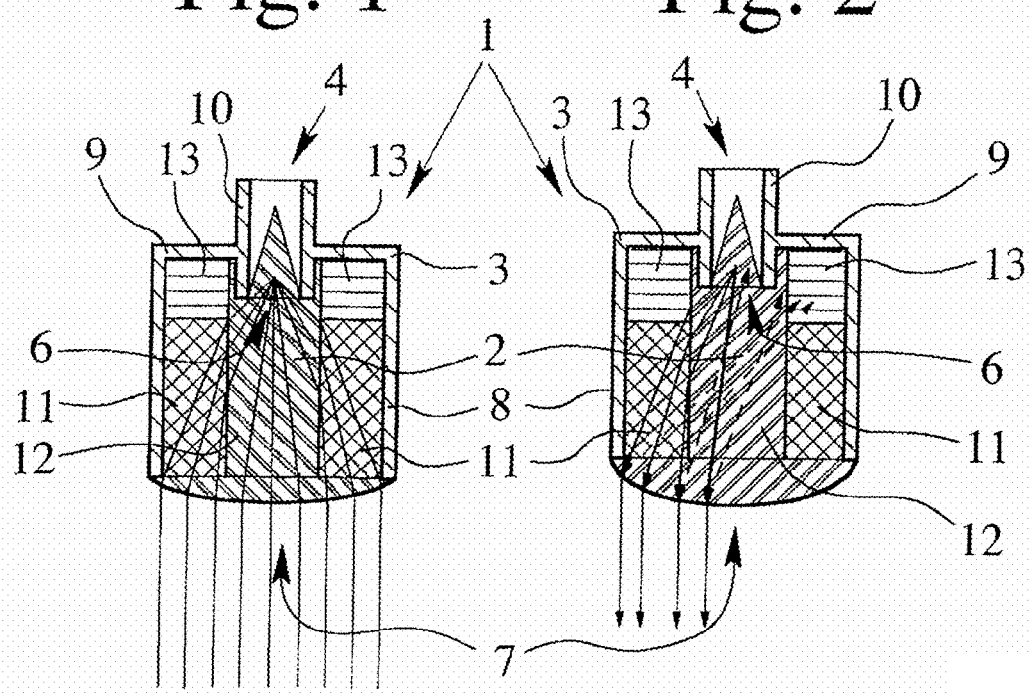
Fig. 1   Fig. 2
Fig. 3   Fig. 4

DIELECTRIC ANTENNA

BACKGROUND OF THE INVENTION

1. Field of Invention

The invention relates to a dielectric antenna having an at least partially dielectric body and an electrically conductive sheath, wherein the dielectric body can be struck with electromagnetic radiation on a supply section and the electromagnetic radiation can at least partially be emitted from the dielectric body via a lens-shaped radiation section. The conductive sheath essentially surrounds the dielectric body from the supply section to the radiation section and a supply opening is provided in the conductive sheath in the area of the supply section and a radiation opening is provided in the conductive sheath in the area of the radiation section.

2. Description of Related Art

Dielectric antennae are known from different fields of engineering in very different configurations. However, dielectric antennae have in common that dielectric materials are used for guiding and emitting electromagnetic waves, in particular, such dielectric materials that are particularly low-loss. It is known to use, e.g., TEFLON® or polypropylene or other dielectrics having a low permittivity as a dielectric material for the dielectric body.

Dielectric antennae are often used, e.g., for fill level measurement in industrial process measurement engineering. In such—but also in other—fields of use, it is of particular advantage for the antennae to have a main emission direction that is as narrow as possible, and at the same time, a configuration that is as compact as possible. However, these requirements are contradictory in terms of constructive measures, which normally have to be used for technical implementation. A narrow directional characteristic in the main emission direction can, as is generally known, first be achieved using a large aperture—i.e., opening area—of the radiation section. So that the aperture is also used in the sense of a narrow main emission direction, the electromagnetic radiation emitted from the emission area of the lens has an even as possible phase front, wherein such an even phase front is more easily implemented with an increasing length of the antenna, which conflicts with the desired compact configuration.

In addition to the difficult implementation of a narrow main radiation direction and simultaneous compact configuration, known dielectric antennae have a further disadvantage, which is associated with the mutual arrangement of electromagnetic supply element—waveguide—and the dielectric body or, respectively, lens formed of dielectric material.

In the configuration of antennae, in which the electromagnetic supply element and the dielectric body have direct contact with one another, the dielectric body is enclosed by at least parts of the electromagnetic supply element, namely the conductive sheath. When it is being discussed that the conductive sheath "essentially" encloses the dielectric body from the supply section to the radiation section, then it is meant that it is not compulsory that the conductive sheath serving as a boundary of the electromagnetic radiation extends exactly to the edge of the radiation section, since possibly due to the chosen geometry of the sheath, it is not possible that electromagnetic radiation struck in the supply section reaches this end area of the dielectric body. It is also meant that it is not compulsory that the sheath be a "closed" sheath in an optical sense, since, depending on the chosen electromagnetic radiation, the desired effect of reflection is also achieved by an amply closed, conductive grate.

In other configurations, an electromagnetic supply element—waveguide—and the dielectric body or, respectively, the lens made of dielectric material, are arranged at a distance from one another, so that a space results between the supply element and the dielectric body.

Both of the variations mentioned above have the disadvantage that a configuration suitable also, for example, for hygienic purposes can only be poorly implemented. Aside from the already very challenging structural implementation of an antenna having a dielectric body at least partially enclosed by the conductive sheath, this configuration has the additional disadvantage that the conductive sheath and the dielectric body extend together up to a far preceding area of the antenna and are comparably exposed and, thus, are at risk for contamination. In the antenna construction with the space between the electromagnetic supply element and the dielectric body, there is always the risk of contamination of the antenna surfaces that are facing the space; furthermore, excess and negative pressure applications could be a problem due to the existing space.

Furthermore, such dielectric antennae having a tapered form opening in the direction of radiation and having a tapered conductive sheath have been shown to be disadvantageous in that the production effort for such angled—but not right-angled—constructions is comparably high, so that there is interest in finding simpler and more inexpensive ways to produce antennae configurations, having at least comparable radiation characteristics to those antennae known from the prior art.

SUMMARY OF THE INVENTION

It is, thus, a primary object of the present invention to at least partially avoid the mentioned disadvantages of the known dielectric antennae.

The above object is first and essentially met with the dielectric antenna in question in that the dielectric body has essentially the cross-section of the radiation opening in the area of the supply section. It is, thereby, achieved that the dielectric body is no longer subject to appreciable cross-section changes over its entire extent in the main radiation direction, so that it ultimately fills up the radiation opening in the radiation section. In particular, it is not necessary, for example, to produce a tapered dielectric body and a tapered conductive sheath corresponding to this tapered dielectric body. The dielectric antenna formed according to the invention can be produced with considerably less effort than known constructions. Though slightly more dielectric material is needed to produce the dielectric body, the advantages balance this out, by far.

According to a particularly preferred embodiment of the dielectric antenna according to the invention, the conductive sheath is designed like a pot, i.e., has a cylindrical sidewall and a base having a supply opening in the supply section of the antenna, wherein the radiation opening essentially has the cross-section of the cylindrical sidewall—which, in turn, is perpendicular to the main radiation direction.

Such hollow bodies having cylindrical sidewalls are particularly easy to produce, regardless of a material chipping (turning, milling) or non-chipping (deep-drawing) manufacturing method. The supply opening in the base of the conductive sheath serves to introduce the electromagnetic radiation into the dielectric body or, respectively into the inside of the conductive sheath. Cylindrical is not to be understood in a limiting manner here as in circular-cylindrical, but rather any geometry suitable for guiding electromagnetic radiation can be imagined as long as the cross-sectional geometry of the conductive sheath and the dielectric body remain essentially unchanged in the radiation direction.

Preferably, the supply section is additionally formed by a waveguide, which is attached to the conductive sheath on the outside and at the supply opening or which is inserted in the supply opening in the conductive sheath and then preferably extends into the dielectric body. In both cases, a connection to an electromagnetic supply source can be made in a simple manner.

The lens-shaped radiation section in the dielectric antenna according to the invention is fundamentally disengaged so that electromagnetic waves are emitted from the radiation section having an even as possible phase front. Here, it is to be taken into consideration that in order to achieve an even phase front, the runtimes of the different parts of the electromagnetic radiation from the supply section to the different spots of the lens surface of the radiation section have to be approximately the same and that the refraction of the electromagnetic radiation resulting at the transition from the surface of the dielectric body in the radiation section to the outer space has to take place due to the dielectricity transfer between the dielectric body and the outer space in the direction of the main radiation direction, so that good directional characteristics result.

Due to the transfer of dielectricity in the transition area from the dielectric body in the outer space, a part of the electromagnetic radiation is reflected back into the antenna, i.e., into the dielectric body. The design of the dielectric body according to the invention has the advantage, in this case, that only a small portion of the re-reflected electromagnetic radiation is reflected into the supply section or, respectively, into the supply opening of the supply section and leads to undesired interference; this being a much greater problem in tapered antenna geometry.

In a particularly advantageous embodiment of the dielectric antenna according to the invention, it is provided that the dielectric body consists of a dielectric in a boundary section adjacent to the conductive sheath, which has a lower permittivity than the other sections of the dielectric body, in particular than the core section and the radiation section of the dielectric body. It is achieved by this design that an internal refraction of the electromagnetic radiation in the direction of the radiation area occurs at the boundary layer between the boundary section and the core section of the dielectric body.

Using this measure, the electromagnetic radiation reaches the radiation area directly—without previous reflection—which previously, without the low-permittivity boundary area, struck the sidewall of the conductive sheath. Furthermore, the electromagnetic radiation hitting the boundary area of the radiation section of the dielectric body arrives at a shallower angle than is the case in dielectric bodies that consist of a uniform dielectric. For this reason, only a comparably lower correction of the radiation path is necessary by the lens-shaped radiation section, so that the lens thickness can be considerably less in total. Furthermore, the antenna can be built distinctly shorter in the main radiation direction in order to illuminate the same radiation opening and to achieve the same directional characteristics as comparably longer conventional dielectric antennae. The results of this measure are short-built dielectric antennae having very flat lens geometry.

A further particularly preferred embodiment of the dielectric antenna according to the invention is wherein the dielectric body has a feed-side absorber layer in the supply section for absorbing reflected electromagnetic radiation. In the feed-side absorber layer, a recess is provided in the area of the feed opening, so that electromagnetic radiation, with which the dielectric body is struck, is not handicapped by the absorber layer when entering into the dielectric body. The absorber layer has the characteristic of absorbing electromagnetic radiation, ultimately to transfer it into heat.

In order to avoid losses when the electromagnetic radiation from the supply section enters into the dielectric body, the absorber layer is, in particular, adjacent to the conductive sheath and, in particular, not provided in the primary strong field area of the dielectric body. The term "primary strong field area" is used for the area that is impinged directly—i.e., without consideration of reflection—by electromagnetic radiation. Thus, it is ensured that, in the dielectric body, only reflected electromagnetic radiation—e.g., from the conductive sheath—is reflected onto the absorber layer and cannot be reflected any longer. Reflections are often not desired because they can lead to noise in the emission signal and to echoes in the emission signals to be evaluated and make the evaluation of the electromagnetic radiation emitted and received by the dielectric antenna more difficult.

In a further preferred embodiment of the invention, the dielectric body has a side absorber layer in a boundary section adjacent to the conductive sheath, which is provided, in particular, in the boundary section to the sidewall of the conductive sheath and, in particular, is not in the primary strong field area of the dielectric body. This side absorber layer makes it possible to absorb reflected and to be reflected electromagnetic radiation emitted in the direction of the sidewall of the conductive sheath and, thus, to avoid further reflection. It is of particular advantage, here, when the side absorber layer is arranged adjacent to the supply-side absorber layer in the supply section of the dielectric body. In particular, this is advantageous in view of producing such an absorber layer.

The necessity that the side absorber layer is not provided in the primary strong field area of the dielectric body leads to a tapering open in the direction of the main radiation direction of the side absorber layer and, thus, to a tapering off of the dielectric body or, respectively, the boundary section of the dielectric body, which consists of a dielectric having a low permittivity.

According to the invention, it is further provided that the supply-side absorber layer or the side absorber layer consists of at least one electrically and/or magnetically active substance or includes such a substance. Saying "electrically or, respectively, magnetically active" means that an adequate conductivity is present in order to reach the desired absorption of the reflected electromagnetic radiation. Preferably, such an absorber layer is made of synthetics having embedded conductive black—as it is used in ceramics, for example, for increasing the conductivity—and/or having an embedded carbon and/or having embedded conductive micro-fibers or having other embedded inherently conductive materials.

In a further preferred embodiment of the invention, the lens-shaped radiation section has a dielectric adjusting layer for avoiding reflections. The thickness of the adjusting layer is about ¼ of the wavelength based on the center frequency of the emitted spectrum of the electromagnetic radiation. The permittivity of the materials used for the adjusting layer conforms with the permittivity of the dielectric body—or, respectively, the permittivity of the core section and the radiation section of the dielectric body—and to the permittivity of the outer space around the antenna, which consists of air in normal use. In the ideal case, the permittivity of the material of the adjusting layer is equal to the square root of the product of both permittivities mentioned above. The adjusting layer configured in this manner results in a considerable decrease of interfering reflection in the area of the transition between the antenna and outer space and, thus, associated multiple reflections within the dielectric body.

In the antenna geometry according to the invention—in particular, in the use of the supply-side and/or the side absorber layer, reflections or, respectively, their consequences can be reduced within the dielectric body by forming the lens-shaped radiation section so that the electromagnetic radiation reflected back into the dielectric body is preferably reflected to the supply-side absorber layer and/or the side absorber layer or, however, also to the flat, non-lined, supply-side section of the dielectric antenna, which encloses the supply opening.

In detail, there are numerous possibilities for designing and further developing the dielectric antenna according to the invention as will be apparent from the following detailed description in connection with the accompanying drawings.

BRIEF DESCRIPTION OF THE DRAWINGS

FIG. 1 is a schematic sectional view of a dielectric antenna according to the invention, FIG. 2 is a further schematic view of a dielectric antenna according to the invention having a dielectric body having a material with low permittivity in the boundary section, FIG. 3 is a further schematic sectional view of a dielectric antenna according to the invention having a supply-side absorber layer, FIG. 4 is a schematic view of a dielectric antenna of FIG. 3 showing radiation paths of reflected electromagnetic radiation.

DETAILED DESCRIPTION OF THE INVENTION

Figure 5:
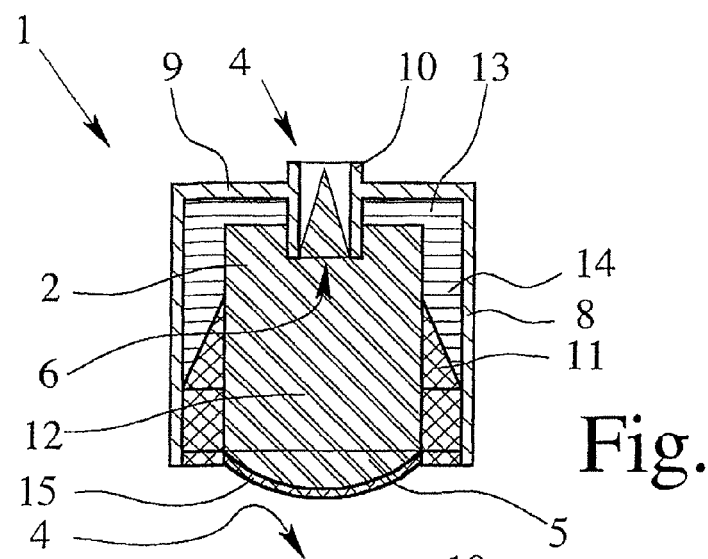
FIG. 5 is a schematic sectional view of a dielectric (antenna) according to the invention having a side absorber layer and a dielectric adjusting layer on the dielectric lens.

FIG. 1 shows a first, very simple embodiment of a dielectric antenna 1 according to the invention having a dielectric body 2 and an electrically conductive sheath, wherein the dielectric body 2 can be struck by electromagnetic radiation and the electromagnetic radiation—at least partially—can be emitted from the dielectric body 2 via a lens-shaped radiation section 5. The conductive sheath 3 encompasses the dielectric body 2 from the supply section 4 to the radiation section 5. A supply opening 6 is provided in the supply section 4 of the conductive sheath 3 and a radiation opening 7 is provided in the area of the radiation section of the conductive sheath, so that the dielectric body 2 can be struck by electromagnetic radiation.

The dielectric antenna shown in FIG. 1 is characterized—as are all of the dielectric antennae shown in the other figures—in that the dielectric body 2 essentially has the cross section of the radiation opening 7 in the area of the supply section 4. Such antennae can be produced easily and at low costs, since angled—not right-angled—contours of the dielectric body 2 or the electrically conductive sheath 3 do not have to be implemented here. As opposed to a funnel-shaped geometry, the shown geometry has several advantages also in respect to the electromagnetic radiation reflected back to the boundary between the lens-shaped radiation section 5 and to the vicinity of the dielectric body, since only a small portion of the reflected interfering radiation returns to the supply opening 6 and is, otherwise, reflected onto the base area of the conductive sheath 3 in the area of the supply section 4.

In all of the dielectric antennae shown in FIGS. 1 to 8 and 10 to 12, the conductive sheath 3 is designed like a pot, namely, it has a cylindrical sidewall 8 and a base having a supply opening 6 in the supply section 4 of the antenna 1. In the illustrated embodiment, the sidewall 3 forms a circular cylinder, a geometry that is easy to produce and is advantageous in respect to guiding electromagnetic waves. The radiation opening 7 essentially has the cross-section of the cylindrical sidewall 8—perpendicular to the main direction of radiation.

In the embodiments shown, the supply section 4 encompasses a waveguide 10, which is inserted in the conductive sheath 3 in the supply opening 6 and which extends into the dielectric body 2, in the present case also into the inside of the outer contour formed by the conductive sheath 3. The waveguide 10, thus, has an external thread that is not shown in detail, which is advantageous; in particular, in order to affix the dielectric body 2 in the electrically conductive sheath 3. For this purpose, the dielectric body 2 has a corresponding inner thread.

Among other things, embodiments are shown in FIGS. 1 to 6, in which the dielectric body 2—at least partially—is made of a dielectric in a boundary section 11 adjacent to the conductive sheath 3, wherein the boundary section 11 is adjacent to the sidewall 8 of the conductive sheath 3. The boundary section 11 is made of a dielectric that has a lower permittivity than the other sections of the dielectric body 2, in particular, namely, it has a lower permittivity than the core section 12 and the radiation section 5 of the dielectric body 2. Using this design, it is achieved that the electromagnetic radiation that would not reach the radiation section 5 in a direct manner, now reaches the radiation section directly. It is essential that the permittivity of the boundary section 11 is lower than that of the core section 12 of the dielectric body 2 so that the electromagnetic radiation is refracted at the boundary between the core section 12 and the boundary section 11 of the dielectric body 2 in the direction of the radiation section 5. As seen in comparison with FIG. 1, this measure allows for a distinctively shorter configuration of the dielectric antenna than with the use of a homogenous dielectric body 2. The lens-shaped radiation section 5 is also considerably less curved, since the electromagnetic radiation that reaches the lens-shaped radiation section from the supply section is already prepared by the use of different dielectrics, which is why the curve of the lens-shaped radiation section 5 can be considerably less.

In FIG. 3, the dielectric body 2 has a supply-side absorber layer 13 in the supply section 4 for absorbing reflected electromagnetic radiation, and which has a recess in the area of the supply opening 6. The supply-side absorber layer 13 is arranged adjacent to the conductive sheath 3 in such a manner that it is not provided in the primary strong field area of the dielectric body. The term "primary strong field" area is used for the area that is impinged by electromagnetic radiation that reaches the radiation opening 7 without reflection. If the absorber layer 13 were arranged in this area, avoidable losses in radiation output would be the result. Using the supply-side absorber layer 13, it is possible to absorb reflected electromagnetic radiation, i.e., ultimately converting it into heat. This guarantees that the electromagnetic radiation emitted by the dielectric antenna 1 and the electromagnetic radiation absorbed by the dielectric antenna 1 leaves the dielectric antenna 1 or, respectively, is absorbed by the antenna 1 as pure as possible—without unintentional echoes.

In the dielectric antenna according to FIG. 5, the dielectric body 2 has a side absorber layer 14 in a boundary section adjacent to the conductive sheath 3, which is provided in the boundary section to the sidewall of the conductive sheath 3. This side absorber layer 14 is also capable of absorbing reflected electromagnetic radiation that does not fall in the radiation section 5 of the dielectric antenna, rather in the area of the sidewall 8. This supply-side absorber layer 13 and the side absorber layer 14 form a coherent area in the dielectric antenna 1. In the cases shown, the supply-side absorber layer 13 and the side absorber layer 14 are formed using synthetics, in which inherently conducive materials are embedded, here conductive carbon fibers. The conductivity causes the electromagnetic field invading the absorber layers 13, 14 to break down due to induced current and short- circuiting.

The dielectric antenna 1 shown in FIG. 4 has a lens-shaped radiation section 5 that is designed so that the electromagnetic radiation reflected back into the dielectric body 2 is reflected onto the supply-side absorber layer 13 and the side absorber layer 14, so that the portion of the radiation that returns to the supply opening 6 is very low, which is why the shown dielectric antenna 1 has a very low interference.

Figure 6:
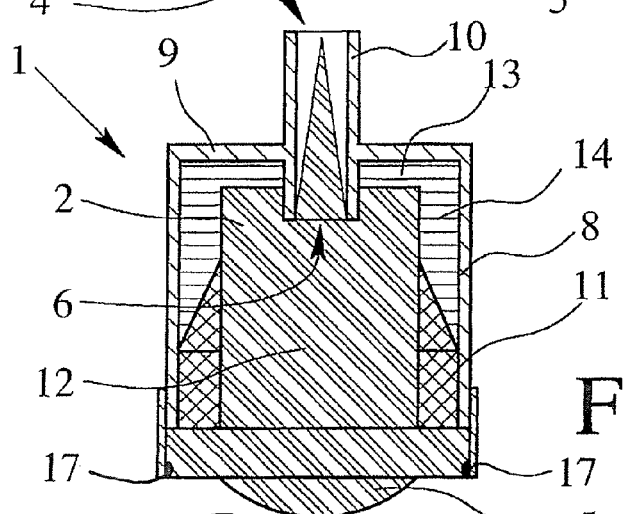
FIG. 6 is a schematic sectional view of a further dielectric antenna according to the invention having an implemented hygienic connection.

A dielectric antenna 1 is shown in FIG. 6, which has a fixture 17 in the area of the radiation section 5 for implementing a hygienic connection. This hygienic connection is, in particular, leak-proof in all necessary measures against the intrusion of adhesions. In this case, the hygienic connection is implemented by a seal based on an o-ring. This connection further allows the substitution of a radiation-side terminating element—here in the form of a lens-shaped radiation section 5.

Figure 7:
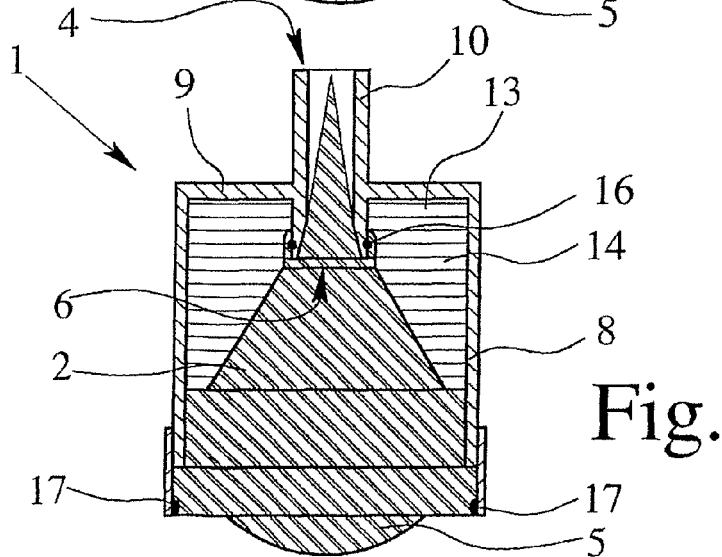
FIG. 7 is a schematic sectional view of a dielectric antenna according to the invention having a fixing device for the dielectric body.

FIG. 7 shows a dielectric antenna 1, in which the dielectric body 2 is affixed by means of a fixing device in the supply section 4 or, respectively, on the waveguide 10. In a variation that is not shown, this is done using a screw connection, presently with an o-ring 16 that is embedded in the circumference of the waveguide 10 and is engaged or, respectively, can be engaged with a corresponding groove in the dielectric body 2.

Figure 8:
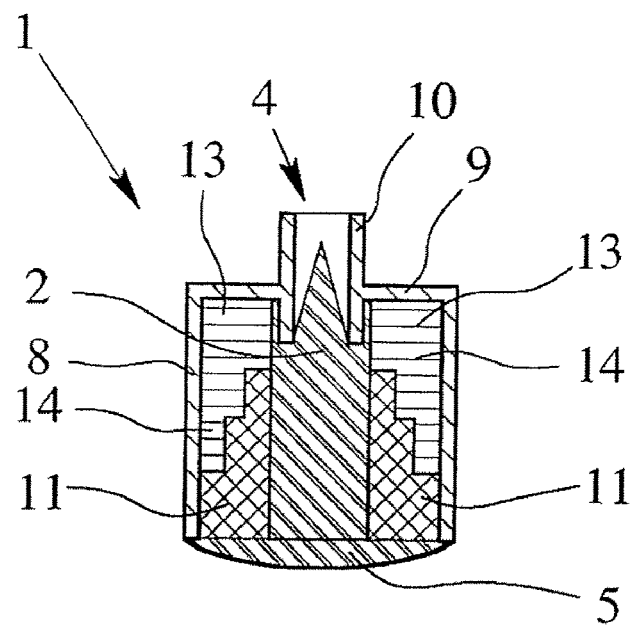
FIG. 8 is a schematic sectional view through a dielectric antenna according to the invention having transitional stages between the absorber and the boundary section of the dielectric body having low permittivity.

FIG. 8 illustrates that a suitable adjustment of the geometry of the boundary section 11 having low permittivity and the side absorber layer 14 can occur in stages, which is particularly simple to implement in production, which allows for the production of conical fittings according to FIGS. 5 to 7 to be avoided.

Figure 9:
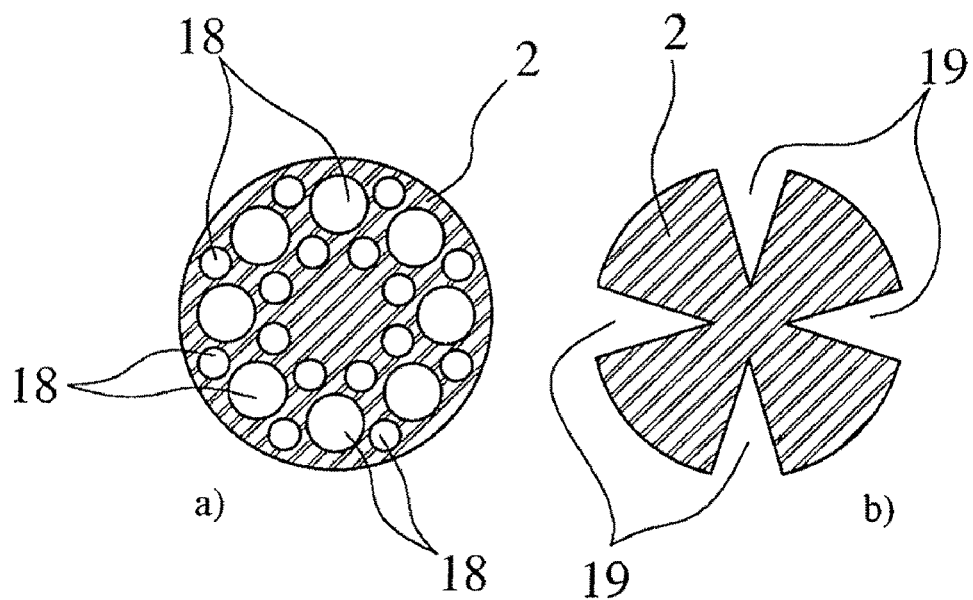
FIGS. 9a & 9b is a schematic sectional view through the dielectric body perpendicular to the main radiation direction having continuous permittivity profiles.

FIG. 9 demonstrates that continuous permittivity progressions can also be implemented, in that a sort-of continuous cavity density is implemented in the dielectric body 2. In the embodiment shown in FIG. 9a, this is done using drill holes 18 with differing diameters that are implemented at different depths in the dielectric body 2. In FIG. 9b, the implementation is produced using wedged-shaped recesses 19 in the dielectric body 2.

Figure 10:
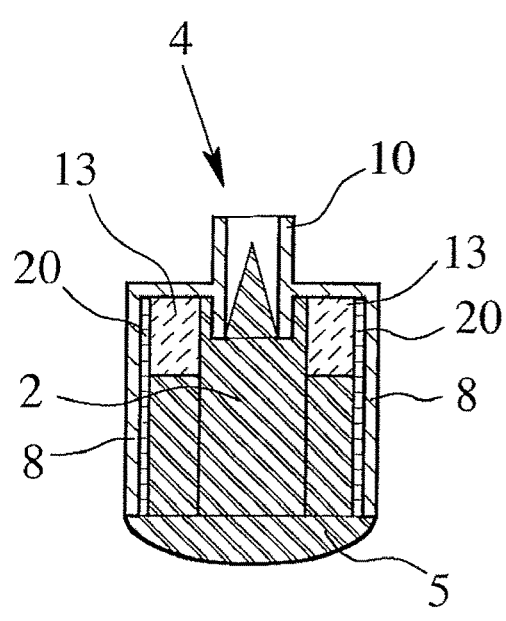
FIG. 10 is a schematic cross-sectional view through a dielectric antenna according to the invention having a side, mechanical compensation area.
Figure 11:
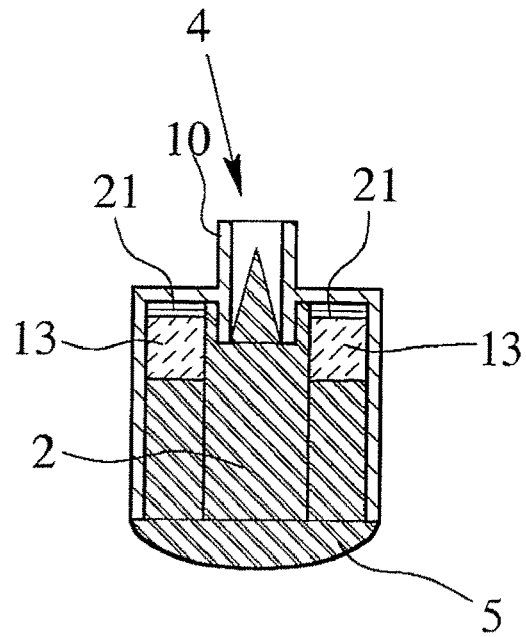
FIG. 11 is a schematic sectional view through a dielectric antenna according to the invention having a supply-side, mechanical compensation area
Figure 12:
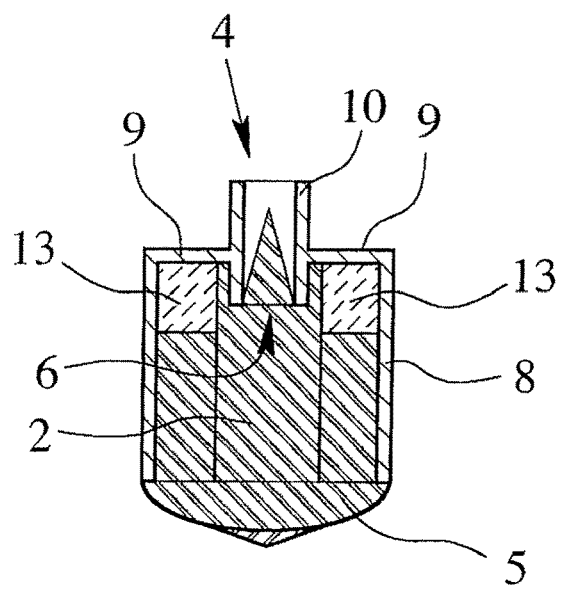
FIG. 12 is a schematic sectional view through a dielectric antenna according to the invention having a drip tip.

FIGS. 10 & 11 show the implementation of compensation spaces 20, 21 that are presently filled with elastic material or—in embodiments not shown—are simply hollow spaces. At any rate, they serve the purpose of compensating, in particular, material expansion due to temperature influences.

What is claimed is:

1. Dielectric antenna, comprising:
an at least partially dielectric body and
an electrically conductive sheath,
wherein the at least partially dielectric body has a supply section for receiving electromagnetic radiation and a lens-shaped radiation section from which the electromagnetic radiation is at least partially emitting,
wherein the conductive sheath essentially surrounds the at least partially dielectric body from the supply section to the radiation section,
wherein the conductive sheath has a cylindrical sidewall,
wherein a supply opening is provided in the conductive sheath in an area of the supply section;
wherein a radiation opening is provided in the conductive sheath in an area of the radiation section;
wherein a cross-section of the supply section is the same as a cross-section of the radiation opening, and the cross-section of the radiation opening is the same as a cross-section of the cylindrical sidewall, extending perpendicular to a main radiation direction,
wherein the at least partially dielectric body comprises a dielectric material in a boundary section adjacent to the conductive sheath that has a lower permittivity than other sections of the dielectric body.

2. Dielectric antenna according to claim 1, wherein the conductive sheath is pot-shaped.

3. Dielectric antenna according to claim 1, wherein the supply section is formed by a waveguide which is attached to the conductive sheath around the supply opening.

4. Dielectric antenna according to claim 1, wherein the supply section is formed by a waveguide which is inserted in the supply opening in the conductive sheath and extends into the at least partially dielectric body.

5. Dielectric antenna according to claim 1, wherein the at least partially dielectric body has a supply-side absorber layer in the supply section for absorbing reflected electromagnetic radiation, wherein the absorber layer has a recess in the area of the supply opening, wherein the supply-side absorber layer is adjacent to the conductive sheath and is outside of a primary strong field area of the dielectric body.

6. Dielectric antenna according to claim 1, wherein the at least partially dielectric body has a side absorber layer in a boundary section adjacent to the conductive sheath.

7. Dielectric antenna according to claim 6, wherein the side absorber layer is provided in a boundary section next to the sidewall of the conductive sheath.

8. Dielectric antenna according to claim 7, wherein the side absorber layer is outside of a primary strong field area of the at least partially dielectric body.

9. Dielectric antenna according to claim 5, wherein a side absorber layer is provided adjacent to the supply-side absorber layer in the supply section of the at least partially dielectric body.

10. Dielectric antenna according to claim 5, wherein the supply-side absorber layer comprises at least one of an electrically active substance and a magnetically active substance.

11. Dielectric antenna according to claim 6, wherein the side absorber layer comprises at least one of an electrically active substance and a magnetically active substance.

12. Dielectric antenna according to claim 1, wherein the lens-shaped radiation section has a dielectric adjusting layer for avoiding reflections.

13. Dielectric antenna according to claim 5, wherein lens-shaped radiation section has a dielectric adjusting layer for avoiding reflections and wherein the lens-shaped radiation section is formed so that the electromagnetic radiation reflected back into the at least partially dielectric body is reflected onto the supply-side absorber layer.

14. Dielectric antenna according to claim 6, wherein the lens-shaped radiation section has a dielectric adjusting layer for avoiding reflections and wherein the lens-shaped radiation section is formed so that the electromagnetic radiation reflected back into the at least partially dielectric body is reflected onto the side absorber layer.

15. Dielectric antenna according to claim 1, wherein an o-ring fixture is provided in the area of the radiation section for implementing a hygienic connection, with which a radiation-side terminating element can be exchangeably connected to the dielectric antenna.

16. Dielectric antenna according to claim 1, wherein the at least partially dielectric body is affixed by a fixing device in the supply section.

17. Dielectric antenna according to claim 3, wherein the at least partially dielectric body is affixed by a fixing device on the waveguide.

18. Dielectric antenna according to claim 1, wherein said at least partially dielectric material is adjacent to a sidewall of said conductive sheath, and said dielectric material has a lower permittivity than a core section and said radiation section of said dielectric body.

* * * * *